US012228874B2

(12) United States Patent
Ube

(10) Patent No.: US 12,228,874 B2
(45) Date of Patent: Feb. 18, 2025

(54) IMAGE FORMING APPARATUS HAVING A NOISE-REDUCIBLE STRUCTURE

(71) Applicant: BROTHER KOGYO KABUSHIKI KAISHA, Nagoya (JP)

(72) Inventor: Tetsuharu Ube, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/170,115

(22) Filed: Feb. 16, 2023

(65) Prior Publication Data

US 2023/0266704 A1 Aug. 24, 2023

(30) Foreign Application Priority Data

Feb. 21, 2022 (JP) ................................ 2022-024839

(51) Int. Cl.

*G03G 15/00* (2006.01)
*B65H 5/36* (2006.01)
*B65H 85/00* (2006.01)

(52) U.S. Cl.

CPC ........... *G03G 15/6511* (2013.01); *B65H 5/36* (2013.01); *B65H 85/00* (2013.01); *B65H 2601/521* (2013.01)

(58) Field of Classification Search

CPC ...... G03G 15/6511; B65H 5/36; B65H 85/00; B65H 2601/521; B65H 2402/40; B65H 2402/44; B65H 2405/10; B65H 2402/441

See application file for complete search history.

(56) References Cited

U.S. PATENT DOCUMENTS 8,849,175 B2 * 9/2014 Miwa ................ G03G 15/6579 271/301
10,087,026 B2 * 10/2018 Morita .................. B65H 5/062
2006/0216060 A1 9/2006 Kuwata et al.
2015/0309460 A1 10/2015 Yamamoto

FOREIGN PATENT DOCUMENTS

JP 2011-84404 A 4/2011
JP 2015-209284 A 11/2015

OTHER PUBLICATIONS

Brother HL-2270DW Laser Printer (product), Released Oct. 16, 2012 (Year: 2012).*

* cited by examiner

*Primary Examiner* — Jennifer Bahls
*Assistant Examiner* — Quang X Nguyen
(74) *Attorney, Agent, or Firm* — Merchant & Gould P.C.

(57) ABSTRACT

An image forming apparatus, having a housing including a first side wall and a second side wall, a sheet tray movable in a first direction, an image forming device to form an image on a sheet, and a chute movable in a second direction, is provided. The sheet tray has a first outer frame, having a first dent denting downward. The chute has a second outer frame. The second outer frame has a second dent denting upward and forming an opening together with the first dent and a handle extending downward from the second dent. At least one of the first outer frame and the second outer frame has a wall shielding a part of the opening at a position upstream from the handle in the second direction.

14 Claims, 5 Drawing Sheets

IMAGE FORMING APPARATUS HAVING A NOISE-REDUCIBLE STRUCTURE

REFERENCE TO RELATED APPLICATIONS

This application claims priority from Japanese Patent Application No. 2022-024839 filed on Feb. 21, 2022. The entire content of the priority application is incorporated herein by reference.

BACKGROUND ART

An image forming apparatus capable of printing images on both sides of a sheet is known. The image forming apparatus may print an image on one side of the sheet with an image forming device, turn the sheet over, and print another image on the other side of the sheet. The image forming apparatus may have a duplex conveyer, which may convey the sheet exiting the image forming device with the image printed on one side thereof to return to the image forming device. The duplex conveyer may be located at, for example, above a sheet tray in the image forming apparatus.

DESCRIPTION

The duplex conveyer may have a chute, which is detachable to be drawn outward from the image forming apparatus so that a user may access and remove the sheet jammed in the duplex conveyer easily. The chute may be drawn, for example, rearward of the image forming apparatus, farther from the user. In order to enable the chute to be drawn rearward easily by the user, a handle may be provided to a back side of the chute. In the meantime, it may not be favorable to provide a jutting structure on the back side of the image forming apparatus. In this regard, an opening that may work as a handle may be formed on the back side of the chute.

However, through the opening formed on the back side of the image forming apparatus, noises produced by, for example, conveying the sheets and motors running, may leak outside.

The present disclosure is advantageous in that an image forming apparatus having an opening to be used as a handle for drawing a chute of a duplex conveyer outward, in which the duplex conveyer is located above a sheet tray, and in which leakage of noises through the opening may be restrained, is provided.

Figure 2:
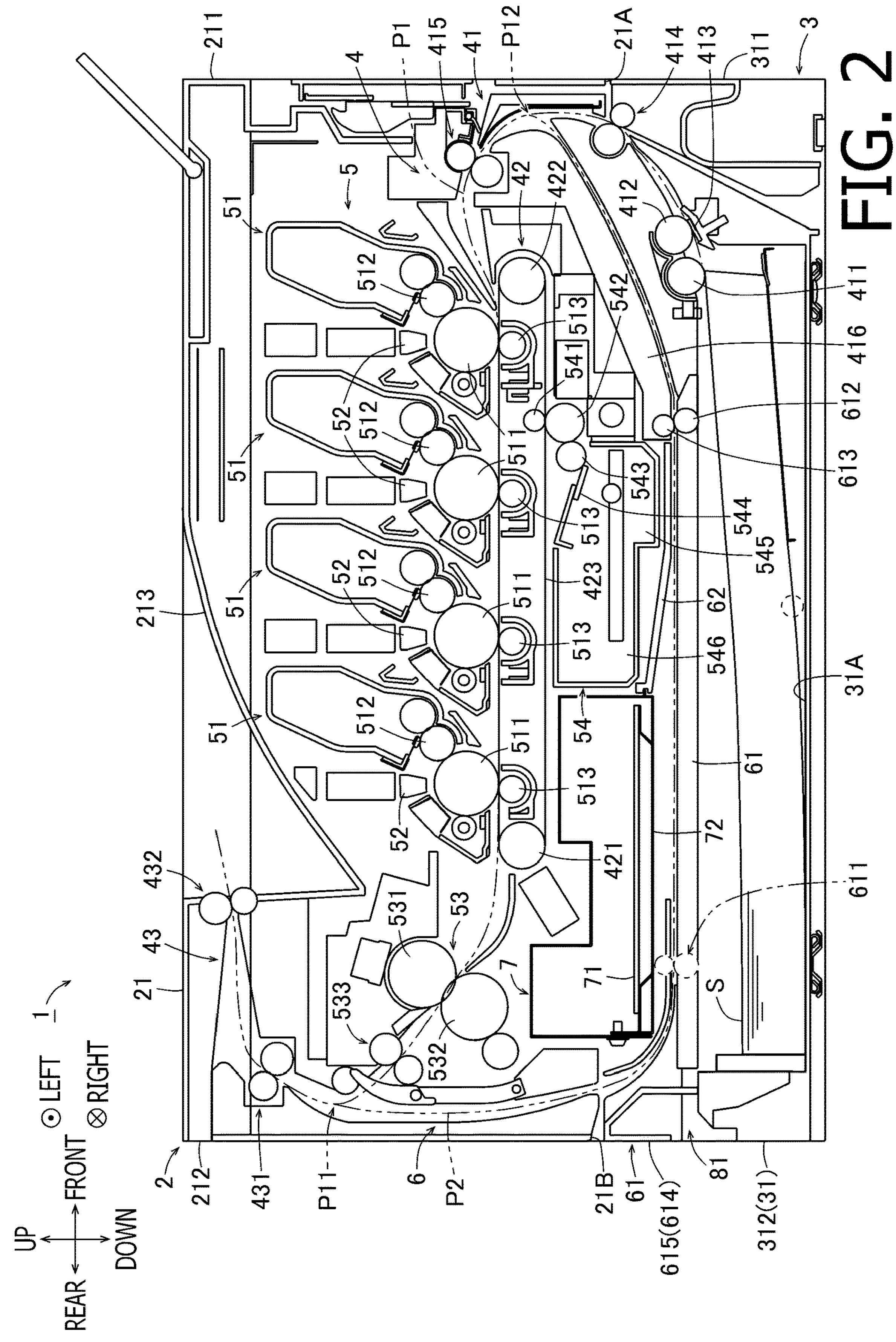
FIG. 2 is a cross-sectional view of the image forming apparatus.

In the following description, a right-hand side and a left-hand side in FIG. 2 to a viewer will be defined as a front side and a rear side, respectively, of an image forming apparatus 1, and a nearer side and a farther side to the viewer with respect to a cross section in FIG. 2 will be defined as a leftward side and a rightward side, respectively, of the image forming apparatus 1. An upper side and a lower side in FIG. 2 will be defined as an upper side and a lower side, respectively, of the image forming apparatus 1. A front-to-rear or rear-to-front direction may be called as a front-rear direction, a left-to-right or right-to-left direction may be called as a widthwise direction, and an up-to-down or down-to-up direction may be called as a vertical direction. A frontward direction and a rearward direction may be called as a first direction and a second direction, respectively, and the widthwise direction intersects orthogonally with the second direction.

[Overall Configuration of Image Forming Apparatus]

Figure 1:
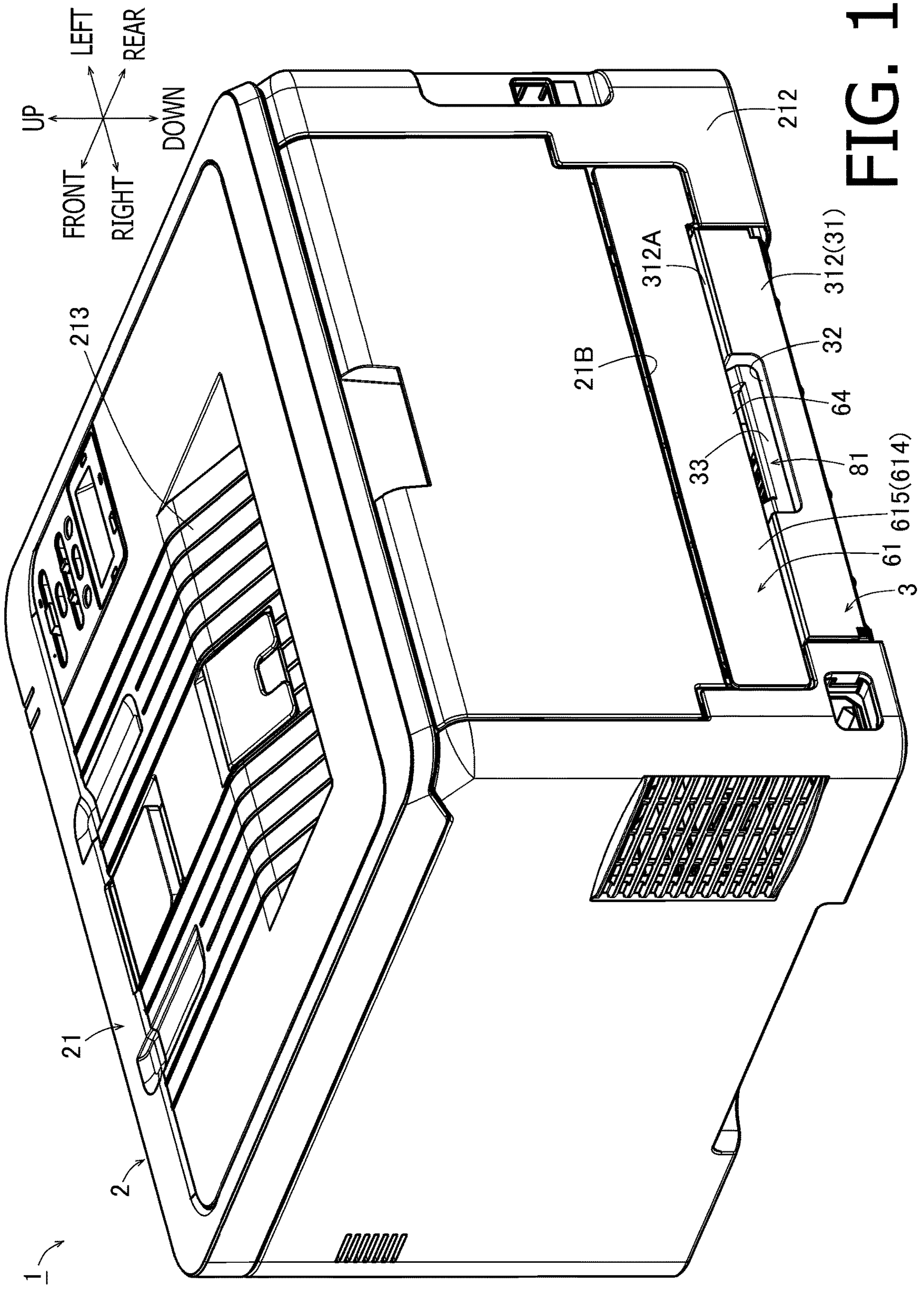
FIG. 1 is a perspective view of an image forming apparatus.

FIG. 1 is a perspective view of the image forming apparatus 1. FIG. 2 is a cross-sectional view of the image forming apparatus 1. An exterior appearance of the image forming apparatus 1 is provided by a housing 2 having a form of a substantially rectangular box. The housing 2 includes a frame (not shown), which supports inner parts, and a cover 21, which covers the frame and forms the exterior appearance. The cover 21 includes a front wall 211, which is located on one side in the front-rear direction, a rear wall 212, which is located on the other side in the front-rear direction, and an ejection tray 213, which is formed on an upper side. The front wall 211 has an opening 21A at a lower position, and the rear wall 212 has an opening 21B at a lower position.

The image forming apparatus 1 may be a color laser printer, which may form multicolor images on sheets S such as paper sheets and OHP sheets. The housing 2 accommodates a sheet tray 3, a conveyer 4, an image forming device 5, a duplex conveyer 6, and a controller 7. In the housing 2, the image forming device 5 is located in an upper and central area, the conveyer 4 is located in a lower and rearward area with respect to the image forming device 5, the duplex conveyer 6 is arranged in frontward and rearward areas and in a lower area with respect to the conveyer 4, and the controller 7 is located between the image forming device 5 and the duplex conveyer 6.

The sheet tray 3 has a first outer frame 31 having a form or a top-open box and includes a sheet storage 31A, in which sheets S in a stack may be stored. The first outer frame 31 has a front wall 311 located in the opening 21A and a rear wall 312 located in the opening 21B.

The front wall 311 aligns on a plane with the front wall 211 of the cover 21, and the rear wall 312 aligns on a plane with the rear wall 212 of the cover 21. The rear wall 312 of the first outer frame 31 and the rear wall 212 of the cover 21 form an outer surface of the image forming apparatus 1. The sheet tray 3 is movable with respect to the housing 2 to be drawn frontward through the opening 21A. The first outer frame 31 may not necessarily have the form of the top-open box as long as the first outer frame 31 has the rear wall 312, which forms the outer surface of the image forming apparatus 1 together with the rear wall 212 of the cover 21.

The conveyer 4 includes parts and members arranged along a conveyer path P1 and may convey the sheet S along the conveyer path P1. The conveyer path P1 is a path extending from the sheet tray 3 through the image forming device 5 to the ejection tray 213. The conveyer 4 includes a feeder 41, a belt unit 42, and an ejection device 43, which are arranged in this given order along the conveyer path P1 from upstream to downstream in a conveying direction to convey the sheet S.

The feeder 41 includes a feed roller 411, a separation roller 412, a separation pad 413, a conveyer roller pair 414, and a registration roller pair 415. The feed roller 411, the separation roller 412, and the separation pad 413 may supply the sheets S from the sheet tray 3 to the conveyer path P1 one by one. The sheet S supplied to the conveyer path P1 may be conveyed by the conveyer roller pair 414 and the registration roller pair 415 toward the image forming device 5.

The belt unit 42 is detachably attached to the housing 2 and includes a driving roller 421, which may rotate in conjunction with the image forming device 5, a driven roller 422, which is rotatable at a position separated from the driving roller 421, and a conveyer belt 423 strained around the driving roller 421 and the driven roller 422. The conveyer belt 423 may circulate, with the sheet S riding thereon, to convey the sheet S along the conveyer path P1 through an area below drum units 51 in the image forming device 5 to a fuser 53.

The ejection device 43 includes an intermediate ejection roller pair 431, which is located between a branch point P11 in the conveyer path P1 and the ejection tray 213, and an ejection roller pair 432. The intermediate ejection roller pair 431 and the ejection roller pair 432 are switchback rollers, of which rotating directions may be switched between a forward direction and a reverse direction. The intermediate ejection roller pair 431 and the ejection roller pair 432 may rotate in the forward direction to eject the sheet S conveyed from the fuser 53 at the ejection tray 213 and in the reverse direction to turn the sheet S over and convey the sheet S to the duplex conveyer path P2.

The image forming device 5 may form images on the sheets S electro-photographically. Optionally, however, the image forming device 5 may form images on the sheets S in another printing method such as inkjet printing. The image forming device 5 may be a multicolor printer in a so-called direct-tandem style, having four (4) drum units 51 aligning in line along the front-rear direction, LED exposure heads 52, the fuser 53, and a belt cleaner 54.

The four drum units 51 are provided to correspond to toners in four (4) colors, which are black, yellow, magenta, and cyan, on one-to-one basis. Each drum unit 51 includes a photosensitive drum 511, a developing roller 512, and a transfer roller 513 located to face the photosensitive drum 511 across the conveyer belt 423.

In the image forming device 5, each photosensitive drum 511 charged evenly by a charger (not shown) may be selectively exposed to a beam emitted from the exposure LED head 52. The exposing beam may selectively remove the charges from surface of the photosensitive drum 511, and electrostatic latent images as selected may be formed on the surface of the photosensitive drum 511.

To each developing roller 512, developing bias is applied. When the electrostatic latent images formed on the photosensitive drum 511 come to face the respective developing roller 512, due to potential difference between the electrostatic latent images and the developing roller 512, the toner may be supplied from the developing roller 512 to the electrostatic latent images. Thus, images in the toner may be formed on the surface of the photosensitive drum 511.

The sheet S conveyed to the image forming device 5 may be further conveyed by the conveyer belt 423 in the image forming device 5 through the position between the conveyer belt 423 and the photosensitive drums 511. As the sheet S travels through the position between the conveyer belt 423 and the photosensitive drums 511, the toner images on the photosensitive drums 511 may be transferred onto the sheet S one by one with transfer bias applied to the transfer rollers 513.

The fuser 53 is located in the conveyer path P1 at a position downstream from the photosensitive drums 511 in the conveying direction. The fuser 53 includes a heat roller 531 and a pressure roller 532 pressed against the heat roller 531. The heat roller 531 is located on a side of the sheet S, on which the image is formed, and may rotate in synchronization with the conveyer belt 423 to apply a conveying force to the sheet S while heating the toners on the sheet S.

The pressure roller 532 is located on a side opposite to the heat roller 531 across the sheet S and may press the sheet S against the heat roller 531. The heat roller 531 may receive a rotating force from the heat roller 531 through the sheet S contacting the heat roller 531 and may be rotated.

The fuser 53 further includes a fuser-ejection roller pair 533, which is located downstream from the heat roller 531 and the pressure roller 532 in the conveying direction.

As the sheet S with the toner images transferred thereon travels through a position between the heat roller 531 and the pressure roller 532, the toner images may be thermally fixed to the sheet S. The sheet S with the thermally fixed toner images may be nipped by the fuser-ejection roller pair 533 and conveyed to the intermediate ejection roller pair 431.

The belt cleaner 54 is detachably located at a position between the belt unit 42 and the duplex conveyer 6 and may collect waste toners from the conveyer belt 423. The belt cleaner 54 includes a backup roller 541, a cleaning roller 542, a collection roller 543, a scraper blade 544, a collection chamber 545, and a waste toner box 546.

The backup roller 541 is located on an inner side of the conveyer belt 423 and contacts an inner upper surface of the belt 423. The cleaning roller 542 is located at a position to face the backup roller 541 across the conveyer belt 423 and contacts an outer lower surface of the conveyer belt 423.

In the belt cleaner 54, the waste toners adhered to the conveyer belt 423 may be collected by the cleaning roller 542, the collection roller 543, the scraper blade 544, and the collection chamber 545, and the collected waste toners may be stored in the waste toner box 546.

A cleaning operation may start after images are formed by the image forming device 5. Through the cleaning operation, the waste toners adhered to the conveyer belt 423 may be held electrically on a surface of the cleaning roller 542, to which bias is applied, and electrostatically transferred to the collection roller 543. The waste toners transferred to the collection roller 543 may be scraped off from the collection roller 543 by the scraper blade 544 and fall in the collection chamber 545. The waste toners fallen in the collection chamber 545 may be conveyed rearward by a conveyer, which is not shown, and stored in the waste toner box 546.

The duplex conveyer 6 includes parts and members arranged along a duplex conveyer path P2 and may convey the sheet S along the duplex conveyer path P2. The duplex conveyer path P2 branches off from the conveyer path P1 at the branch point P11, which is between the fuser 53 and the intermediate ejection roller pair 431, extends through an area above the sheet tray 3, and merges with the conveyer path P1 at a merge point P12, which is between the sheet tray 3 and the image forming device 5. In this arrangement, the duplex conveyer path P2 may be shortened compared to an arrangement, in which the duplex conveyer path P2 is arranged below the sheet tray 3.

The duplex conveyer 6 has a lower chute 61, which may guide a lower surface of the sheet S, and an upper chute 62, which may guide an upper surface of the sheet S, at positions higher than the sheet tray 3 and lower than the image forming device 5. The lower chute 61 has a skew roller pair 611, and a duplex conveyer roller 612, and a second outer frame 614. The skew roller pair 611 and the duplex conveyer roller 612 may guide the sheet S along the duplex conveyer path P2. The second outer frame 614 supports the skew roller pair 611 and the duplex conveyer roller 612 and may guide the lower surface of the sheet S.

The duplex conveyer roller 612 may nip the sheet S with a driven roller 613. The driven roller 613 is supported by a supporting member 416 of the feeder 41, which is located above the duplex conveyer roller 612. The second outer frame 614 has a rear wall 615, which is located in the opening 21B. The rear wall 615 aligns on a plane with the rear wall 212 of the cover 21. The lower chute 61 may be drawn rearward through the opening 21B. The rear wall 615 of the second outer frame 614 and rear wall 212 of the cover 21 form an outer surface of the image forming apparatus 1. A form of the second outer frame 614 may not necessarily be limited as long as the second outer frame 614 has the rear wall 615, which forms the outer face of the image forming apparatus 1 together with the rear wall 212 of the cover 21.

The duplex conveyer 6 may convey the sheet S, having been conveyed by the intermediate ejection roller pair 431, with the image formed on one side thereof, to the merge point 12. The sheet S conveyed through the merge point P12 may return to the image forming device 5, and the image forming device 5 may form an image on the other side of the sheet S. The sheet S with the images formed on the other side may be ejected by the ejection device 43 at the ejection tray 213. When the sheet S is jammed in the duplex conveyer 6, a user may draw the lower chute 61 rearward and remove the jammed sheet S.

Thus, the image forming apparatus 1 may perform double-face printing, in which the image forming device 5 may form an image on one side of the sheet S, and the sheet P may be conveyed through the duplex conveyer path P2 to return to the image forming device 5, and the image forming device 5 may form another image on the other side of the sheet S.

The controller 7 has a main circuit board (not shown), a low-voltage circuit board 71, a metal plate member 72, and a high-voltage circuit board (not shown), which may apply a voltage higher than the low-voltage circuit board 71 to, for example, the image forming device 5.

The main circuit board is located on a leftward side of a frame of the housing 2. The main circuit board is a board, on which a controller to control the entire image forming apparatus 1, including the low-voltage circuit board 71 and the higher-voltage circuit board. The low-voltage circuit board 71 is located at a position rearward with respect to the belt cleaner 54 and between the duplex conveyer 6 and the image forming device 5. The lower-voltage circuit may apply a lower voltage to, for example, a power circuit.

The metal plate member 72 is an enclosure that encloses the low-voltage circuit board 71 in the vertical direction and the front-rear directions. The high-voltage circuit board may be located on a rightward side of the frame of the housing 2 and may apply the higher voltage to, for example, the image forming device 5.

Next, a noise-reducible structure in the image forming apparatus 1 that may restrain leakage of noise through the rear wall 312 of the sheet tray 3 and the rear wall 615 of the lower chute 61 will be described below.

[Noise-Reducible Structure]

Figure 3:
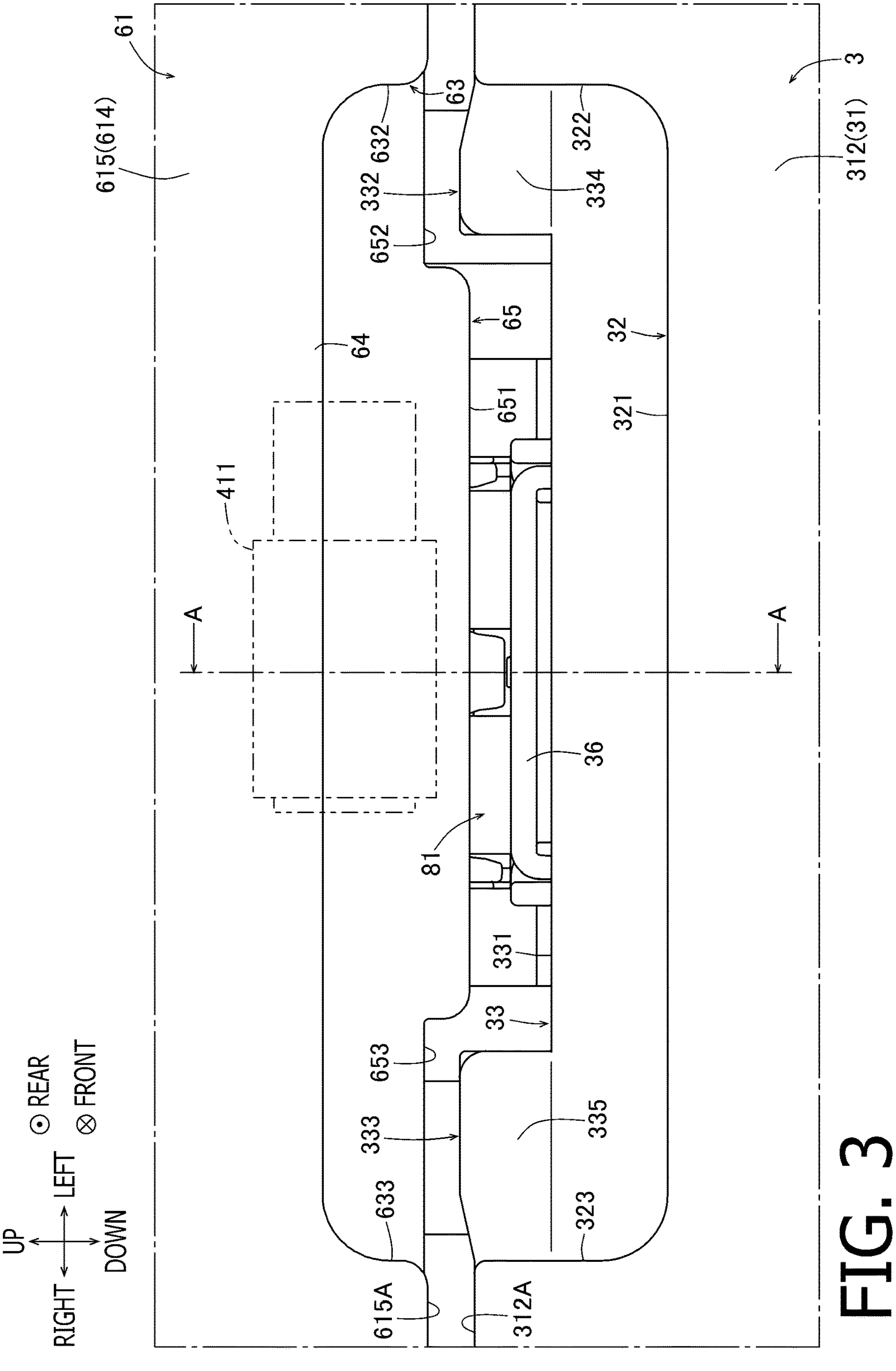
FIG. 3 is an enlarged view of a lower area of a rearward face of the image forming apparatus.
Figure 4:
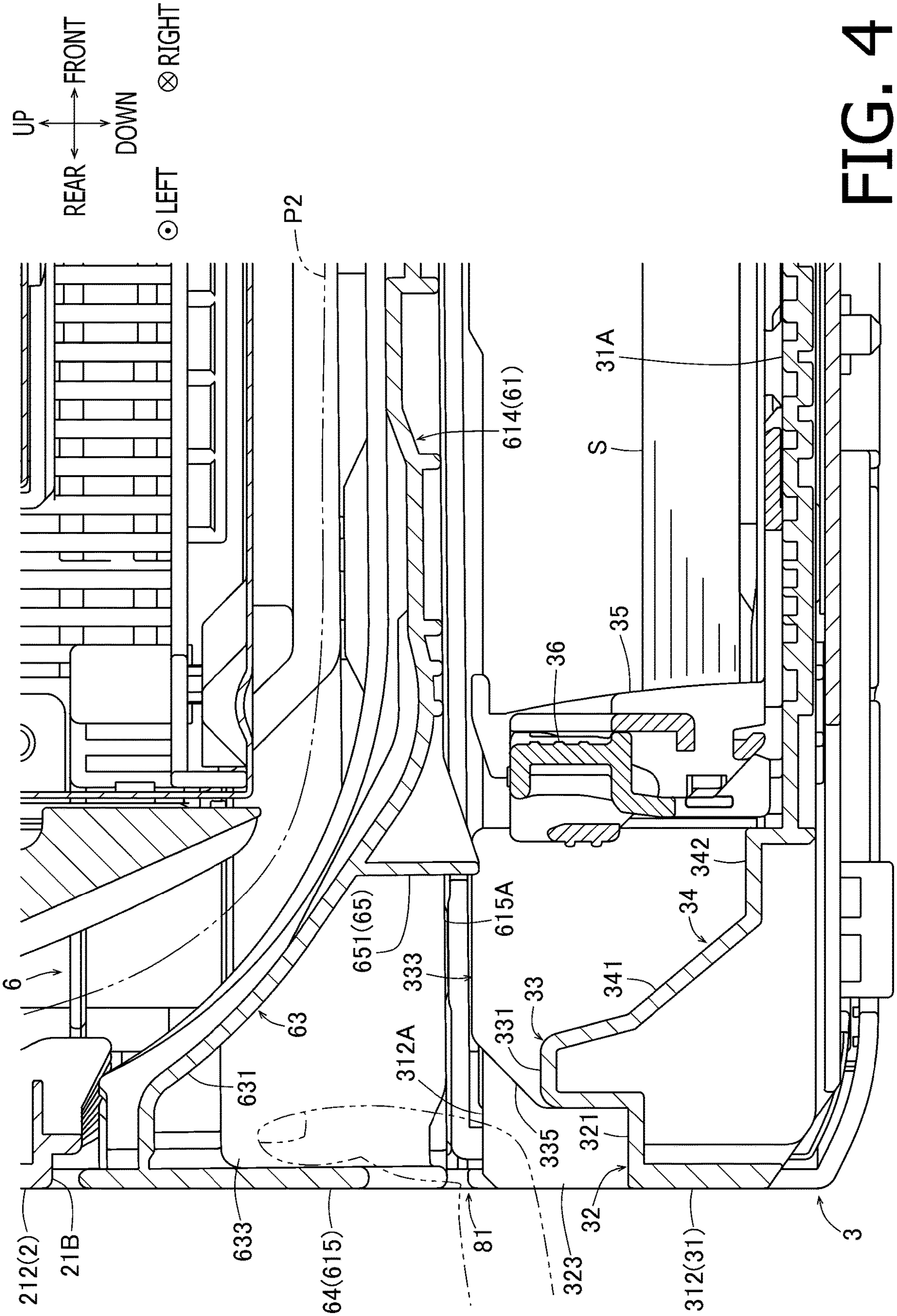
FIG. 4 is a cross-sectional view of the image forming apparatus sectioned at line A-A shown in FIG. 3.
Figure 5:
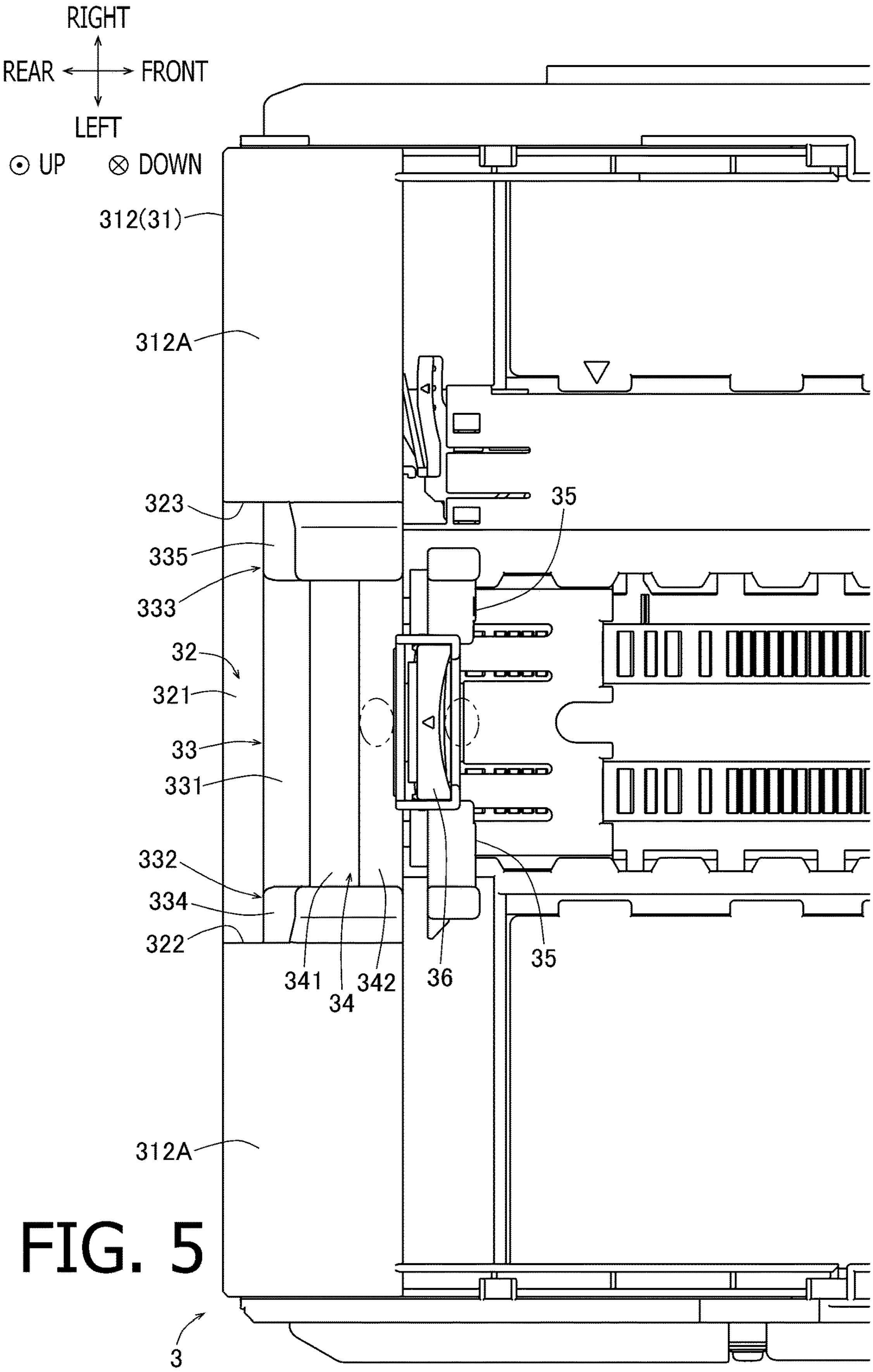
FIG. 5 is an enlarged plan view of a rearward area in a sheet tray.

FIG. 3 is an enlarged rearward view of a lower area of the rear wall 212 in the image forming apparatus 1. FIG. 4 is a cross-sectional view of the image forming apparatus 1 sectioned at line A-A shown in FIG. 3. FIG. 5 is an enlarged plan view of a rearward area in the sheet tray 3.

As shown in FIGS. 3-5, the first outer frame 31 of the sheet tray 3 has a first dent 32, a first wall 33, and a groove 34. As shown in FIGS. 3 and 4, the second outer frame 614 of the lower chute 61 includes a second dent 63, a handle 64, and a second wall 65. The second dent 63 and the first dent 32 form the opening 81.

The sheet tray 3 includes a stopper 35 to regulate a position of rearward edges of the sheets S and a stopper lever 36, which allows the stopper 35 to move in the front-rear direction. FIGS. 4 and 5 show the stopper 35 located at a most rearward position. The stopper 35, when pinched in the front-rear direction as indicated in dash-and-dots lines in FIG. 5, is enabled to move in the front-rear direction. Therefore, the stopper 35 may be moved to a position corresponding to a size of the sheets S, and by regulating the position of the rear ends of the sheets S, the front ends of the sheets S may align.

As shown in FIGS. 3-5, the first dent 32 may be formed by, for example, cutting the rear wall 312 through in the front-rear direction at an upper edge 312A of the rear wall 312 of the first outer frame 31 in a central area in the widthwise direction to dent downward in a substantially rectangular shape. The first dent 32 has a lower surface 321, a left-side surface 322 extending upward from a leftward end of the lower surface 321 to an upper edge 312A of the rear wall 312, and a right-side surface 323 extending upward from a rightward end of the lower surface 321 to the upper edge 312A of the rear wall 312.

The first wall 33 extends upward from the first dent 32. The first wall 33 includes a first central wall 331, a left-side wall 332 and a right-side wall 333 which are a pair of side walls located on a leftward side and a rightward side of the first central wall 331. The first central wall 331 extends upward to a substantially half height of the upper edge 312A of the rear wall 312 from the lower surface 321 of the first dent 32 at a position apart from the left-side surface 322 and from the right-side surface 323 in the widthwise direction.

An upper end of the first central wall 331 is located to be lower than a lower end of the feed roller 411 and lower than an upper end of the stopper lever 36. The first central wall 331 is located apart frontward from a rear end of the first dent 32 by a predetermined distance. In other words, the first central wall 331 is located inward with respect to the opening 81.

The left-side wall 332 extends upward to a position higher than the upper edge 312A of the rear wall 312 of the first outer frame 31 from the lower surface 321 of the first dent 32 to shield a gap between the leftward end of the first central wall 331 and the left-side surface 322 of the first dent 32. The right-side wall 333 extends upward to a position higher than the upper edge 312A of the rear wall 312 of the first outer frame 31 from the lower surface 321 of the first dent 32 to shield a gap between the rightward end of the first central wall 331 and the right-side surface 323 of the first dent 32.

Positions of an upper end of the left-side wall 332 and an upper end of the right-side wall 333 may not necessarily be limited as long as the upper ends of the left-side wall 332 and the right-side wall 333 are located to be higher than the upper end of the central wall 331. The left-side wall 332 and the right-side wall 333 are located on one side and the other side of the feed roller 411, respectively, in the widthwise direction. In other words, the left-side wall 332 is located leftward from the feed roller 411, and the right-side wall 333 is located rightward from the feed roller 411. A rear end of the left-side wall 332 and a rear end of the right-side wall 333 align on a plane with the rear end of the first central wall 331. A front end of the left-side wall 332 and a front end of the right-side wall 333 align on a plane with a front end of the groove 34.

The left-side wall 332 and the right-side wall 333 have slanting surfaces 334, 335, which slant lower toward the opening 81, i.e., rearward, from the upper ends thereof. The upper ends of the slanting surfaces 334, 335 are located at the same position in the front-rear direction as an upper-front end of the first central wall 331.

As shown in FIGS. 4 and 5, the groove 34 is open upward and is located between the first central wall 331 and the stopper lever 36 in the front-rear direction and between the left-side wall 332 and the right-side wall 333 in the widthwise direction. The groove 34 has a slanting surface 341, which slants lower-frontward from a lower-frontward end of the first central wall 331, and a bottom surface 342, which extends horizontally frontward from a lower end of the slanting surface 341 to a position rearward from the stopper lever 36.

As shown in FIGS. 3 and 4, the second dent 63 may be formed by, for example, cutting the rear wall 615 through in the front-rear direction at a lower edge 615A of the rear wall 615 of the second outer frame 614 in a central area in the widthwise direction to dent upward in a substantially rectangular shape. The second dent 63 faces the first dent 32 in the vertical direction. The second dent 63 has an upper surface 631 extending frontward and slanting lower-frontward, a left-side surface 632 extending downward from a leftward end of the upper surface 631 to a lower edge 615A of the rear wall 615, and a right-side surface 633 extending downward from a rightward end of the upper surface 631 to the lower edge 615A of the rear wall 615.

The handle 64 is a member extending downward from the second dent 63. The handle 64 is a plate member extending from the rear end of the upper surface 621 of the second dent 63 downward along the left-side surface 632 and the right-side surface 633 to a position to shield a substantially upper half of the second dent 63. The handle 64 is formed to align on a plane and integrally with the rear wall 615 of the second outer frame 614. As illustrated in dash-and-dots lines in FIG. 4, the user may insert his/her fingers from a lower side of the handle 64 to touch a frontward surface of the handle 64 and pull the handle 64 rearward. Thereby, the lower chute 61 may be drawn rearward.

As shown in FIGS. 3 and 4, the second wall 65 extends downward from the second dent 63. The second wall 65 is located frontward from the handle 64 and the first central wall 331 and rearward from the stopper lever 36. The second wall 65 may extend downward from a position on the upper surface 631 of the second dent 63 substantially equal to a lower end of the handle 64. The second wall 65 has a second central wall 651, a left-side wall 652 and a right-side wall 653, which are located on one side and the other side of the second central wall 651 in the widthwise direction.

The second central wall 651 is located between the left-side wall 652 and the right-side wall 653 in the widthwise direction. A lower end of the second central wall 651 is located to be lower than the upper ends of the left-side wall 652 and the right-side wall 653 and higher than the upper end of the stopper lever 36.

The left-side wall 652 extends downward to a position substantially equal to the lower edge 615A of the rear wall 615 of the second outer frame 614 from the upper surface 631 of the second dent 63 to shield a gap between the leftward end of the second central wall 651 and the left-side surface 632 of the second dent 63. The right-side wall 653 extends downward to a position substantially equal to the lower edge 615A of the rear wall 615 of the second outer frame 614 from the upper surface 631 of the second dent 63 to shield a gap between the rightward end of the second central wall 651 and the right-side surface 633 of the second dent 63.

The positions of the lower ends of the left-side wall 652 and the right-side wall 653 may not necessarily be limited as long as the lower ends of the left-side wall 652 and the right-side wall 653 are located to be higher than the upper ends of the left-side wall 332 and the right-side wall 333 of the first wall 33.

The first wall 33 and the second wall 65 are located on the first outer frame 31 and the second outer frame 614, respectively, frontward with respect to the handle 64 and shield some areas in the opening 81. In this regard, one of the first wall 33 and the second wall 65 may be omitted as long as the one of the first wall 33 and the second wall 65 is located frontward with respect to the handle 64 and shields an area in the opening 81. In this arrangement, the first wall 33 and/or the second wall 65 may restrain leakage of noise that may be produced by conveying the sheets S and noise from motors through the opening 81.

According to the configuration described above, the upper end of the first central wall 331 is located to be lower than the lower end of the feed roller 411, and the left-side wall 332 and the right-side wall 333 are located on one side and the other side of the feed roller 441 in the widthwise direction. In this arrangement, while the first wall 33 may be restrained from colliding with the feed roller 411 when the sheet tray 3 is drawn frontward, the noise may be restrained from leaking more effectively. While the left-side wall 332 and the right-side wall 333 are arranged not to collide with the feed roller 411, the upper ends of the left-side wall 332 and the right-side wall 333 may be extended upward to positions in the vicinity of the lower ends of the left-side wall 652 and the right-side wall 653.

According to the configuration described above, the upper end of the first central wall 331 is located to be lower than the upper end of the stopper lever 36. With the height of the first central wall 331 being smaller, the first central wall 331 may not interfere with the user's fingers hooking to the handle 64 or may not interfere with the lower chute 61 when the sheet tray 3 is being drawn frontward.

According to the configuration described above, the left-side wall 332 and the right-side wall 333 have slanting surfaces 334, 335, which slant lower-rearward from the upper ends thereof. Therefore, the left-side wall 332 or the right-side wall 333 may not interfere with the user's fingers hooking to the handle 64.

According to the configuration described above, the upper ends of the left-side wall 332 and the right-side wall 333 are located to be higher than the upper edge 312A of the rear wall 312 of the first outer frame 31. In this arrangement, the opening 81 may be effectively shielded.

According to the configuration described above, the sheet tray 3 has the groove 34, which is open upward, between the first central wall 331 and the stopper lever 36. Therefore, the user's fingers may enter the space formed with the groove 34 easily to pinch the stopper lever 36 from the upper side.

According to the configuration described above, the lower chute 61 has the second wall 65 to shield the opening 81 more effectively. Moreover, the lower end of the second central wall 651 is located to be lower than the upper ends of the left-side wall 332 and the right-side wall 333 and higher than the upper end of the first central wall 331. In this arrangement, while the second central wall 651 may not collide with the sheet tray 3, the noise may be restrained from leaking effectively.

According to the configuration described above, the second wall 65 is located between the first central wall 331 and the stopper lever 36 in the front-rear direction. In this arrangement, the space to allow entry of the user's fingers to be hooked with the handle 64 may be reserved between the handle 64 and the second wall 65, and the second wall 65 may be restrained from interfering with the fingers.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, the chute that may be drawn rearward may not necessarily be limited to the lower chute 61, but the upper chute 62 may be the chute to be drawn rearward. In this arrangement, the rear wall 615 of the lower chute 61 may not be located in the opening 21B, but the rear wall of the upper chute 62 may be located in the opening 21B while the handle 64 and the second dent 63 may be arranged in the rear wall of the upper chute 62. For another example, both the upper chute 62 and the lower chute 61 may be drawn rearward either integrally or individually.

What is claimed is:

1. An image forming apparatus, comprising:

a housing having a first side wall and a second side wall, the second side wall being spaced from the first side wall;

a sheet tray for storing sheets, the sheet tray being movable in a first direction to be drawn outward, the sheet tray having a first outer frame, the first outer frame forming an outer surface of the image forming apparatus together with the second side wall, the first outer frame having a first dent denting downward;

an image forming device configured to form an image on a sheet supplied from the sheet tray;

a feed roller configured to supply the sheet to the image forming device, and a chute located above the sheet tray, the chute being configured to guide the sheet with the image formed on one side thereof by the image forming device to return to the image forming device, the chute being movable in a second direction opposite to the first direction to be drawn outward, the chute having a second outer frame, the second outer frame forming the outer surface of the image forming apparatus together with the second side wall, the second outer frame having a second dent denting upward and forming an opening together with the first dent, the second outer frame having a handle extending downward from the second dent, wherein:

at least the first outer frame among the first outer frame and the second outer frame has a wall shielding a part of the opening at a position upstream from the handle in the second direction, the wall includes a first wall extending upward from the first dent, the first wall includes a first central wall and a pair of side walls, one and the other of the side walls being located on one side and the other side of the first central wall, respectively, in a widthwise direction intersection orthogonally with the second direction, upper ends of the side walls being located to be higher than an upper end of the first central wall, the upper end of the first central wall is located to be lower than a lower end of the feed roller, and the one and the other of the side walls are located on one side and the other side of the feed roller respectively, in the widthwise direction.

2. The image forming apparatus according to claim 1, wherein the sheet tray has a stopper configured to regulate edges of the sheets on a side toward the opening and a stopper lever allowing the stopper to move in the first direction and the second direction, and the upper end of the first central wall is located to be lower than an upper end of the stopper lever.

3. The image forming apparatus according to claim 2, wherein the side walls have slanting surfaces slanting from the upper ends to be lower toward the opening.

4. The image forming apparatus according to claim 2, wherein the sheet tray has a groove open upward at a position between the first central wall and the stopper lever.

5. The image forming apparatus according to claim 2, wherein the second outer frame has a second wall extending downward from the second dent, the second wall shielding another part of the opening at a position upstream from the handle in the second direction, and the second wall includes a second central wall located between the side walls, a lower end of the second central wall being located to be lower than the upper ends of the side walls and higher than the upper end of the stopper lever.

6. The image forming apparatus according to claim 5, wherein the second wall is located between the first central wall and the stopper lever in the first direction.

7. The image forming apparatus according to claim 1, wherein the upper ends of the side walls are located to be higher than an upper end of the first outer frame.

8. An image forming apparatus, comprising:

a housing having a first side wall and a second side wall, the second side wall being spaced from the first side wall;

a sheet tray for storing sheets, the sheet tray being movable in a first direction to be drawn outward, the sheet tray having a first outer frame, the first outer frame forming an outer surface of the image forming apparatus together with the second side wall, the first outer frame having a first dent denting downward;

a feed roller configured to convey the sheets from the sheet tray; and a chute configured to guide the sheets and located above the sheet tray, the chute being movable in a second direction opposite to the first direction to be drawn outward, the chute having a second outer frame, the second outer frame forming the outer surface of the image forming apparatus together with the second side wall, the second outer frame having a second dent denting upward and forming an opening together with the first dent, the second outer frame having a handle extending downward from the second dent, wherein:

the wall includes a first wall extending upward from the first dent, the first wall includes a first central wall and a pair of side walls, one and the other of the side walls being located on one side and the other side of the first central wall, respectively, in a widthwise direction intersection orthogonally with the second direction, upper ends of the side walls being located to be higher than an upper end of the first central wall, the upper end of the first central wall is located to be lower than a lower end of the feed roller, and the one and the other of the side walls are located on one side and the other side of the feed roller respectively, in the widthwise direction.

9. The image forming apparatus according to claim 8, wherein the sheet tray has a stopper configured to regulate edges of the sheets on a side toward the opening and a stopper lever allowing the stopper to move in the first direction and the second direction, and the upper end of the first central wall is located to be lower than an upper end of the stopper lever.

10. The image forming apparatus according to claim 9, wherein the side walls have slanting surfaces slanting from the upper ends to be lower toward the opening.

11. The image forming apparatus according to claim 9, wherein the sheet tray has a groove open upward at a position between the first central wall and the stopper lever.

12. The image forming apparatus according to claim 9, wherein the second outer frame has a second wall extending downward from the second dent, the second wall shielding another part of the opening at a position upstream from the handle in the second direction, and the second wall includes a second central wall located between the side walls, a lower end of the second central wall being located to be lower than the upper ends of the side walls and higher than the upper end of the stopper lever.

13. The image forming apparatus according to claim 12, wherein the second wall is located between the first central wall and the stopper lever in the first direction.

14. The image forming apparatus according to claim 8, wherein the upper ends of the side walls are located to be higher than an upper end of the first outer frame.

* * * * *